3,275,615
PROCESS FOR PRODUCING POLYETHYLENE IN THE PRESENCE OF TERTIARY BUTYL HYDROPEROXIDE AND n-BUTYLAMINE
Robert R. Krulisch, Charleston, W. Va., assignor to Union Carbide Corporation, a corporation of New York
No Drawing. Filed Dec. 28, 1962, Ser. No. 247,802
2 Claims. (Cl. 260—94.9)

This invention relates to an improved process for producing polyethylene. More particularly, this invention relates to an improved process for producing polyethylene which comprises polymerizing ethylene under elevated conditions of temperature and pressure with a tertiary butyl hydroperoxide catalyst which has been activated with n-butylamine.

In British Patent 824,312, there is described a procedure whereby ethylene is polymerized under high pressure in the presence of peroxide catalyst activated by an organic nitrogenous base wherein the nitrogen atoms are not bonded directly to hydrogen atoms. Primary and secondary amines are not disclosed as useful activators, and indeed these amines are known to be less useful for such purpose, and in some instances even inhibit the polymerization of ethylene.

It has now been discovered, in accordance with the instant invention, that when a specific primary amine, i.e. n-butylamine, is employed as a catalyst activator for a specific peroxide catalyst, i.e. tertiary butyl hydroperoxide, in the high pressure polymerization of ethylene, the yield of polyethylene can be increased up to about 400 percent over that obtained in the absence of such activator. This discovery is indeed surprising and unexpected since increases in yield can be obtained through the use of this system which are significantly greater than are obtained by employing a peroxide catalyst and a tertiary amine activator, which heretofore had been preferred for this purpose.

It has been observed that the increase in yield obtained through the use of n-butylamine activator tends to decrease as reaction conditions are varied so as to produce a polymer having a melt index of greater than 1 decigram per minute. However, regardless of the melt index of the polymer, it is characterized by improved physical properties. When such polymer is cast into a film, the film is characterized by fewer "fisheyes" than films produced from polyethylene prepared in the absence of such activator. The improved appearance of the film makes it especially suitable for use as a packaging material.

In accordance with the instant invention, n-butylamine is employed as a catalyst activator for tertiary butyl hydroperoxide in the high pressure polymerization of ethylene. Ethylene is contacted with the catalyst and activator at a pressure of from about 5000 p.s.i. to about 100,000 p.s.i., preferably from about 15,000 p.s.i. to about 40,000 p.s.i., and at a temperature of from about 150° C. to about 250° C., preferably from about 175° C. to about 225° C. As a result of such procedure there is obtained improved yields of polyethylene having the improved physical properties specified above.

The n-butylamine activator and the tertiary butyl hydroperoxide catalyst can be employed together in ratios varying over rather broad ranges. In general, molar ratios of n-butylamine to tertiary butyl hydroperoxide of from about 0.01:1 to about 100:1 can be advantageously employed. Preferably, for efficiency and economy of operation, the ratio is maintained between 0.1:1 and 50:1.

The concentration of catalyst employed in polymerizing ethylene can vary over a wide range. In general, an amount of tertiary butyl hydroperoxide of from about 1 p.p.m. to about 75 p.p.m., preferably from about 5 p.p.m. to about 50 p.p.m., based upon the total amount of ethylene employed is suitable.

The tertiary butyl hydroperoxide catalyst and n-butylamine activator can be employed in an inert liquid solvent if desired. By an inert liquid solvent is meant a liquid solvent which is essentially nonreactive under the conditions of the reaction. However such solvents may also function as chain transfer agents. Suitable inert liquid solvents which can be employed include saturated aliphatic hydrocarbons such as hexane, heptane, isooctane, and the like; saturated cycloaliphatic hydrocarbons such as cyclohexane, methylcyclohexane, and the like; and aromatic hydrocarbons such as benzene, and the like.

The process of the instant invention is preferably conducted continuously in a tubular reactor, but can also be conducted in a semi-continuous or batchwise manner by procedures well known in the art.

The following examples are set forth for purposes of illustration so that those skilled in the art may better understand this invention, and it should be understood that they are not to be construed as limiting this invention in any manner. Unless otherwise specified, all parts and percentages, as used in the examples, are by weight. Melt index was determined in accordance with ASTM test procedure D–1238–52T and density was determined in accordance with ASTM test procedure D–1505–57T. Fisheye content was determined by comparison with a set of standard films having ratings from −50 (poorest) to +50 or higher (best). A 0 rating is considered average.

*Example I*

Ethylene was continuously fed together with a solution of 0.10 percent by weight of tertiary butyl hydroperoxide in isooctane through a 60-foot long jacketed tubular reactor having an inner diameter of $3/16$ of an inch under a pressure of 30,000 p.s.i. The ethylene was fed at a rate of 28 pounds per hour and the solution was fed at a rate sufficient to provide a concentration of 71.4 parts per million of tertiary butyl hydroperoxide based on the weight of ethylene. The jacket temperature was maintained at 190° C.

Polyethylene and unconverted gas were discharged from the reactor through a suitable pressure control valve. The polymer was cooled and recovered by filtration. The conversion was about 5.25 percent. The polyethylene had a melt index of 3.11 decigrams per minute and a density of 0.9303 gram/cc.

*Example II*

Ethylene was continuously fed through the reactor described in Example I under the same conditions together with a solution of 0.065 percent by weight of tertiary butyl hydroperoxide and 0.049 percent by weight of n-butylamine in isooctane (molar ratio of n-butylamine to tertiary butyl hydroperoxide of 0.9:1). The ethylene was fed at a rate of 28 pounds per hour and the solution was fed at a rate sufficient to provide a concentration of 34.4 parts per million of tertiary butyl hydroperoxide and 26.1 parts per million of n-butylamine based on the weight of ethylene.

The polymerized ethylene was recoverd in the same manner as in Example I. The conversion was about 26.7 percent, an increase of over 400 percent over that obtained in Example I. The polyethylene had a melt index of 1.25 decigrams per minute and a density of 0.9248 gram/cc.

*Example III*

Ethylene was continuously fed through the reactor described in Example I together with a solution of 0.774 percent by weight of tertiary butyl hydroperoxide in isooctane. The ethylene was fed at a rate of 28 pounds per hour and the solution was fed at a rate sufficient to provide a concentration of 28.3 parts per million of tertiary butyl hydroperoxide based on the weight of ethylene. The jacket temperature was maintained at 215° C. and the pressure employed was 30,000 p.s.i.

The polymerized ethylene was recovered in the same manner as in Example I. The polyethylene had a melt index of 6.39 decigrams per minute and a density of 0.9176 gram/cc. The visual fisheye content of a film produced from this polymer was 0.

*Example IV*

Ethylene was continuously fed through the reactor described in Example I under the conditions of Example III together with a solution of 0.06 percent by weight of tertiary butyl hydroperoxide and 0.048 percent by weight of n-butylamine in isooctane (molar ratio of n-butylamine to tertiary butyl hydroperoxide of 0.9:1). The ethylene was fed at a rate of 28 pounds per hour and the solution was fed at a rate sufficient to provide a concentration of 33.1 parts per million of tertiary butyl hydroperoxide and 26.1 parts per million of n-butylamine based on the weight of ethylene.

The polymerized ethylene was recovered in the same manner as in Example I. The polyethylene had a melt index of 2.56 decigrams per minute and a density of 0.9222 grams/cc. The visual fisheye content of a film produced from this polymer was +30.

What is claimed is:

1. A process for producing polyethylene which comprises polymerizing ethylene at a temperature of from about 150° C. to about 250° C. and at pressure of from about 5000 p.s.i. to about 100,000 p.s.i. with a tertiary butyl hydroperoxide catalyst which has been activated with n-butylamine, the molar ratio of n-butylamine to tertiary butyl hydroperoxide being from about 0.01:1 to about 100:1, and the tertiary butyl hydroperoxide being employed in an amount of from about 1 p.p.m. to about 75 p.p.m., based upon the total amount of ethylene employed.

2. A process for producing polyethylene which comprises polymerizing ethylene at a temperature of from about 175° C. to about 225° C. and at a pressure of from about 15,000 p.s.i. to about 40,000 p.s.i. with a tertiary butyl hydroperoxide catalyst which has been activated with n-butylamine, the molar ratio of n-butylamine to tertiary butyl hydroperoxide being from about 0.1:1 to about 50:1, and the tertiary butyl hydroperoxide being employed in an amount of from about 5 p.p.m. to about 50 p.p.m., based upon the total amount of ethylene employed.

References Cited by the Examiner

UNITED STATES PATENTS 2,932,633　4/1960　Juveland _____ 260—94.9
3,072,608　1/1963　Byler _____ 260—94.9

FOREIGN PATENTS 824,312　11/1959　Great Britain.

OTHER REFERENCES

Raff et al.: Polyethylene, vol. XI of High Polymers, Inter-Science Publishers, Inc., New York, 1956 (page 61 relied on).

JOSEPH L. SCHOFER, *Primary Examiner.*

JOSEPH R. LIBERMAN, *Examiner.*

M. B. KURTZMAN, *Assistant Examiner.*